United States Patent
Zhan et al.

(10) Patent No.: US 10,448,154 B1
(45) Date of Patent: Oct. 15, 2019

(54) ENHANCING VOICE QUALITY FOR ONLINE MEETINGS

(71) Applicant: INTERNATIONAL BUSINESS MACHINES CORPORATION, Armonk, NY (US)

(72) Inventors: Sheng Hui Zhan, Ningbo (CN); Chuan Yang Wang, Ningbo (CN); Yan Hu, Ningbo (CN); Jian Long Pan, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/118,860

(22) Filed: Aug. 31, 2018

(51) Int. Cl.
| | |
|---|---|
| H04R 3/00 | (2006.01) |
| H04R 1/40 | (2006.01) |
| G10L 17/00 | (2013.01) |
| G10L 21/0232 | (2013.01) |
| G10L 21/034 | (2013.01) |
| H04R 3/04 | (2006.01) |
| G10L 25/51 | (2013.01) |
| G10L 21/028 | (2013.01) |

(52) U.S. Cl.
CPC ............ H04R 3/005 (2013.01); G10L 17/005 (2013.01); G10L 21/028 (2013.01); G10L 21/0232 (2013.01); G10L 21/034 (2013.01); G10L 25/51 (2013.01); H04R 1/406 (2013.01); H04R 3/04 (2013.01); H04R 2430/01 (2013.01)

(58) Field of Classification Search
USPC .... 381/91, 92, 104, 107, 108, 109, 110, 119
See application file for complete search history.

(56) References Cited

U.S. PATENT DOCUMENTS

| | | | |
|---|---|---|---|
| 7,464,029 B2 | 12/2008 | Visser et al. | |
| 9,001,702 B2 * | 4/2015 | Rodman | H04L 12/1813 370/261 |
| 9,288,576 B2 | 3/2016 | Togami et al. | |
| 9,635,186 B2 | 4/2017 | Pandey et al. | |

(Continued)

FOREIGN PATENT DOCUMENTS

| | | |
|---|---|---|
| CN | 106165015 A | 11/2016 |
| WO | 2015108535 A1 | 7/2015 |

OTHER PUBLICATIONS

Vocal Technologies, LTD., "Voice Quality Enhancement", https://www.vocal.com/voice-quality-enhancement/, accessed Jul. 2, 2018, 4 pages.

(Continued)

*Primary Examiner* — Yosef K Laekemariam
(74) *Attorney, Agent, or Firm* — Michael O'Keefe

(57) ABSTRACT

Embodiments of the present invention disclose a method, computer program product, and system for controlling the volume of microphones in an online meeting. The computer may receive a plurality of voice data from a plurality of user microphones. One or more users in a same room may be identified using the plurality of received voice data and a voice picker, wherein the one or more users in the same room have a same watermark in a set of voice data. A main voice of a user may be recognized from the one or more users in the same room using the voice picker. A microphone volume may be adjusted for each of the one or more users in the same room, wherein the microphone volume of the main voice of the user is increased.

18 Claims, 8 Drawing Sheets

(56) References Cited

U.S. PATENT DOCUMENTS

| | | |
|---|---|---|
| 2007/0165879 A1 | 7/2007 | Deng et al. |
| 2013/0144619 A1* | 6/2013 | Lord .................. G06F 3/165 704/235 |
| 2016/0142451 A1 | 5/2016 | Ouyang et al. |
| 2016/0261749 A1 | 9/2016 | Femal |
| 2016/0293181 A1* | 10/2016 | Daniel ............... G10L 21/0232 |

OTHER PUBLICATIONS

Winsvold et al., "Using Information From a Sound Quality Classifier in Room Analytics and Microphone Mixers", An IP.com Prior Art Database Technical Disclosure, IP.com No. IPCOM000253273D, IP.com Electronic Publication Date: Mar. 19, 2018, Copyright 2018 Cisco Systems, Inc., 5 pages.

Mell, et al., "The NIST Definition of Cloud Computing," National Institute of Standards and Technology, U.S. Department of Commerce, Special Publication 800-145, Sep. 2011, pp. 1-7.

\* cited by examiner

US 10,448,154 B1

ENHANCING VOICE QUALITY FOR ONLINE MEETINGS

BACKGROUND

The present invention relates generally to the field of computing, and more particularly to voice quality for online meetings.

Presently, with the network infrastructure becoming more and more complete, online meetings are widely used for communication in an individual's personal and professional lives. Image capture software exists that can be installed on a user device or through mobile service that is capable of capturing and playing images and audio from various users participating in a meeting. Commonly, people from different locations join an online meeting at the same time; some of whom may be in the same room with their own device.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for controlling the volume of microphones in an online meeting. The computer may receive a plurality of voice data from a plurality of user microphones. One or more users in a same room may be identified using the plurality of received voice data and a voice picker, wherein the one or more users in the same room have a same watermark in a set of voice data. A main voice of a user may be recognized from the one or more users in the same room using the voice picker. A microphone volume may be adjusted for each of the one or more users in the same room, wherein the microphone volume of the main voice of the user is increased.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
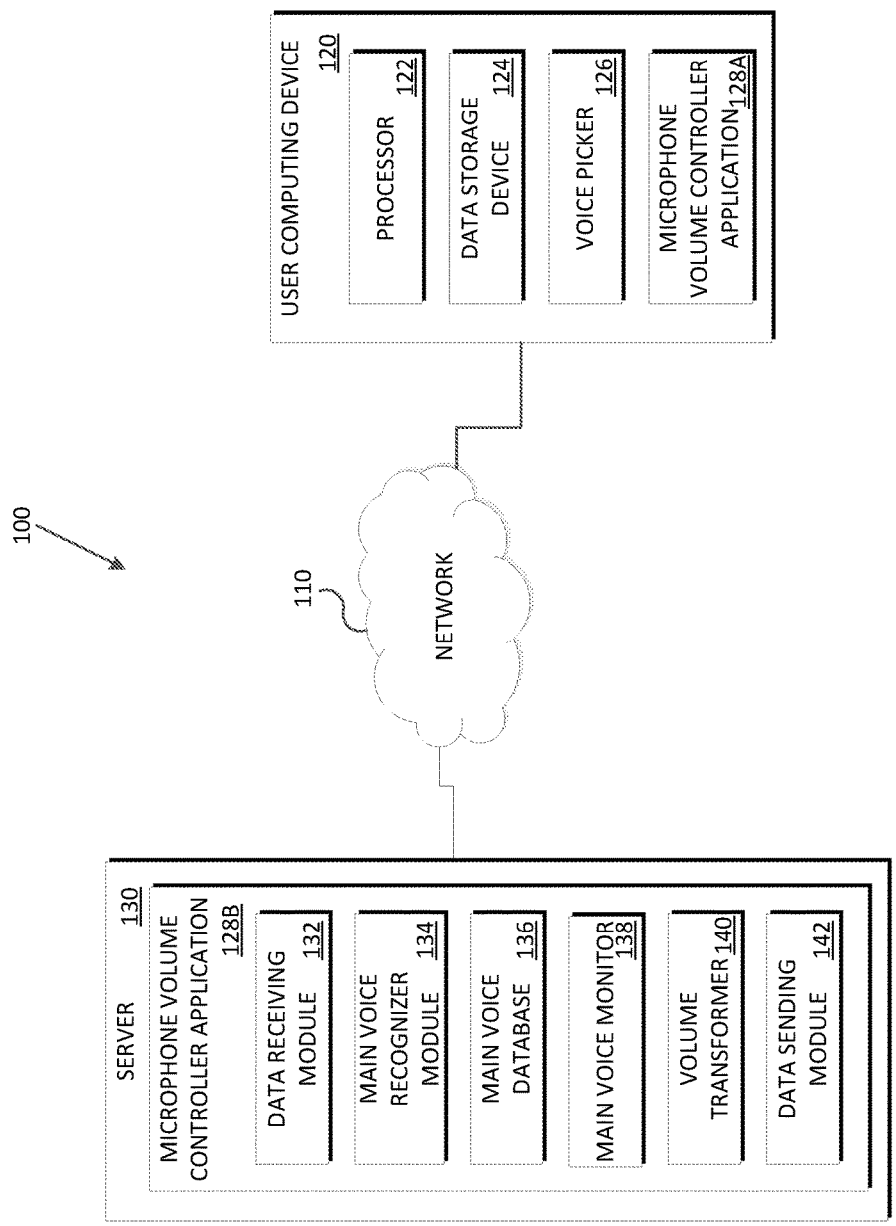
FIG. 1 illustrates an exemplary networked computer environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to voice quality for online meetings. The following described exemplary embodiments provide a system, method, and program for, among other things, a system for enhancing voice quality for online meetings that automatically adjusts microphones in order to provide high quality voice. Therefore, the present invention has the capacity to improve the technical field of computer functionality by enhancing voice quality for online meetings.

As previously described, with the network infrastructure becoming more and more complete, online meetings are widely used for communication in an individual's personal and professional lives. Image capture software exists that can be installed on a user device or through mobile service that is capable of capturing and playing images and audio from various users participating in a meeting. Commonly, people from different locations join an online meeting at the same time; some of whom may be in the same room with their own device.

Online meetings are typical for people in different locations but also for people in the same room. However, when more than one person enables loudspeakers and microphones in the same room, they will produce noise and echo that will affect online meeting quality. People in the same room have to cooperate to enable only one loudspeaker and microphone. However, the voice of the person who is far away from the microphone will not be very loud. Users have to manually switch microphones from one speaker to another in order to provide higher voice quality. As such, it may be advantageous to, among other things, implement a system for enhancing voice quality for online meetings automatically by detecting the main speaker and adjusting the microphones accordingly.

According to one embodiment, the system for enhancing voice quality for online meetings may monitor voice data in order to determine the main speaker and adjust the users microphones accordingly. The microphone volume controller application may receive voice data from each of the participants in an online meeting. The microphone volume controller application may then identify the participants who are in the same room by identifying participants with the same watermark. The microphone volume controller application may recognize the voice of a main participant, or meeting host, by capturing all of the participant voice data in order to denoise and analyze the captured voice data. The voices per tone may be separated and the tone with the largest volume may be selected as the main voice. The microphone volume controller application may transform the voice data by adjusting the main voice to be louder and the other voices to be smaller using the proper ranges. The microphone volume controller application may respond to the user by sending back the adjusted volume. The users microphone volume may be adjusted accordingly.

Referring to FIG. 1, a functional block diagram illustrating a system for enhancing voice quality for online meetings 100 is depicted, according to at least one embodiment. The system for enhancing voice quality for online meetings 100 may include a user computing device 120 and a server 130 interconnected via a network 110.

The network 110 may include various types of communication networks, such as a wide area network (WAN), a local area network (LAN), a telecommunication network, a wireless network, a public switched network and/or a satellite network. The network 110 may include connections, such as wire, wireless communication links, or fiber optic cables. It may be appreciated that FIG. 1 provides only an illustration of one implementation and does not imply any limitations with regard to the environment in which different embodiments may be implemented. Many modifications to the depicted environments may be based on design and implementation requirements.

The user computing device 120 may include a processor 122 and a data storage device 124 that is enabled to host and run a software program, a voice picker 126, and a microphone volume controller application 128A, and communication with the server 130 via the network 110, in accordance with one embodiment of the invention. The user computing device 120 may be, for example, a mobile device, a smart phone, a personal digital assistant, a netbook, a laptop computer, a tablet computer, a desktop computer, or any type of computing device capable of running a program or accessing a network. The user computing device may include internal and external hardware components, as described in further detail below with respect to FIG. 6. In other embodiments, the server 130 may operate in a cloud computing environment, as described in further detail below with respect to FIG. 7 and FIG. 8.

The voice picker 126 may filter the voice data received by the user computing device 120 and then may mix the filtered data. There may be two types of input audio data, raw voice and watermarked voice. An audio watermark may be a unique electronic identifier embedded in an audio signal. High frequency may be added to digitize audio into raw voice. The voice picker 126 may filter the watermarked voice by identifying whether the input audio has watermark audio in it. This may be done to reduce the influence of echo voice. The voice picker 126 may add high frequency to the remaining raw voice. Watermark audio may be specific to a person's voice so watermarked raw voice can be grouped to depict different microphones. The final watermarked raw voice may no longer contain any echo voice.

Equation 1, illustrated below, models a Discrete Fourier Transform that may be used by the voice picker 126 to filter the watermark audio out of the audio input by converting it from the time domain to the frequency domain. $\hat{x}[k]$ represents the samples of a voice in the frequency domain, where k is a positive integer. x[n] represents the samples of a voice in the time domain. N represents the length of a sequence. Equation 1 represents a sum of samples of voice in the time domain being equal to a sample of voice in the frequency domain. The user computing device 120 may have a hard time analyzing voice data in the time domain since its volume is always changing. The voice picker 126 uses Equation 1 to convert the voice data to the frequency domain where the frequency never changes. The voice picker 126 may contain a digit circuit or a chip that performs Equation 1. After the voice data is converted to the frequency domain, the voice picker 126 may analyze the frequency spectrum. When the frequency domain contains ultra-high frequency, the watermarked voice may be dropped. When the frequency domain does not contain ultra-high frequency, the raw voice is converted back to the time domain.

$$\hat{x}[k] = \sum_{n=0}^{N-1} e^{-i\frac{2\pi}{N}nk} x[n] \tag{1}$$

Equation 2, illustrated below, models an Inverse Discrete Fourier Transform that may be used by the voice picker 126 to convert raw voice from the frequency domain to the time domain. x[n] represents the samples of a voice in the time domain, where n is a positive integer. N represents the length of a sequence. $\hat{x}[k]$ represents the samples of a voice in the frequency domain. Equation 2 represents a sum of samples of voices in the frequency domain divided by N to equal a sample of voice in the time domain. Voice data in the time domain may be able to be understood by users. The result of equation 2 is raw voice data. The voice picker 126 may contain a digit circuit or a chip that performs Equation 2.

$$x[n] = \frac{1}{N}\sum_{k=0}^{N-1} e^{i\frac{2\pi}{N}nk} \hat{x}[k] \tag{2}$$

The voice picker 126 may use Equation 1 to convert the raw voice data back to the frequency domain. The voice picker 126 may convert the raw voice data in the frequency domain to the time domain so that the watermark can be added to the raw voice data. The voice picker 126 may contain a signal generator that generates ultra-high frequency. The voice picker 126 may then mix the raw voice in the frequency domain with the generated ultra-high frequency. Additionally, the voice picker 126 may use Equation 2 to convert the raw voice and ultra-high frequency into the time domain. Furthermore, the voice picker 126 may transmit the watermarked voice data in the time domain to the microphone volume controller application 128A.

Figure 7:
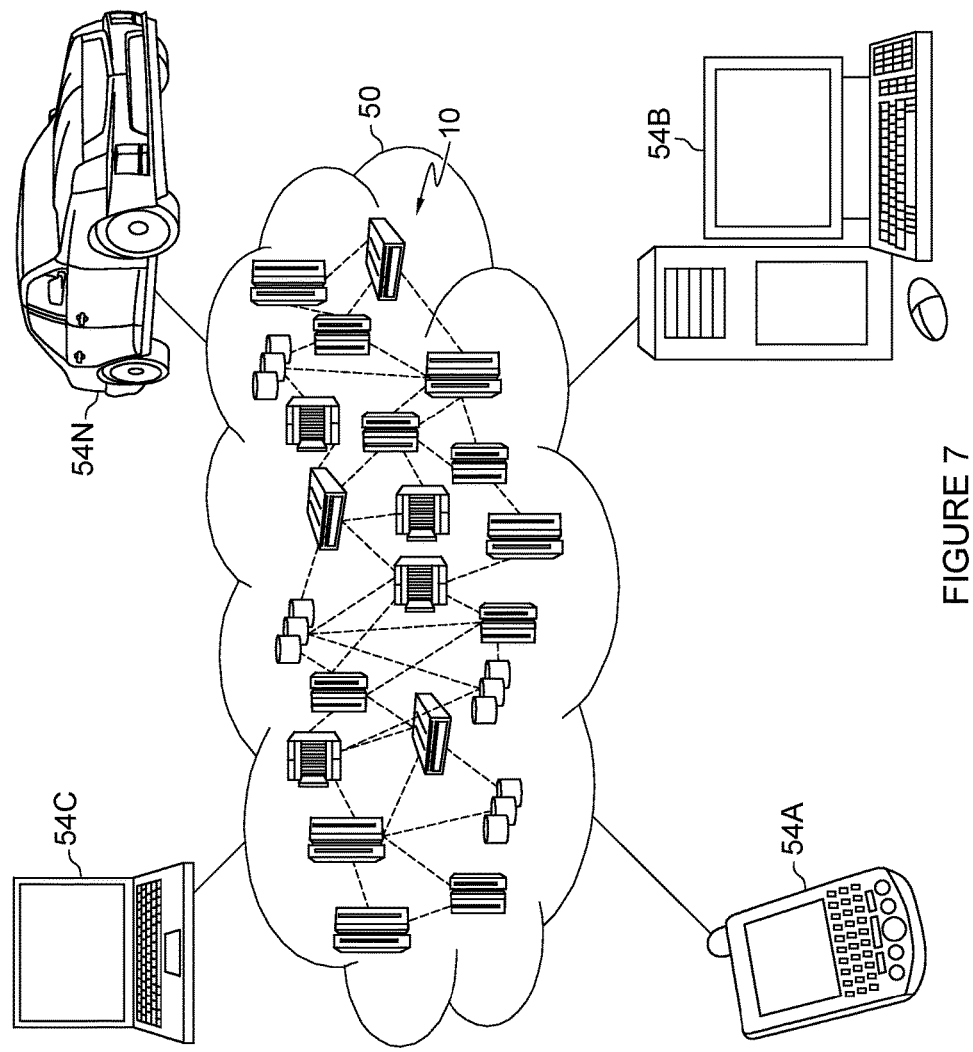
FIG. 7 depicts a cloud computing environment according to an embodiment of the present invention.
Figure 8:
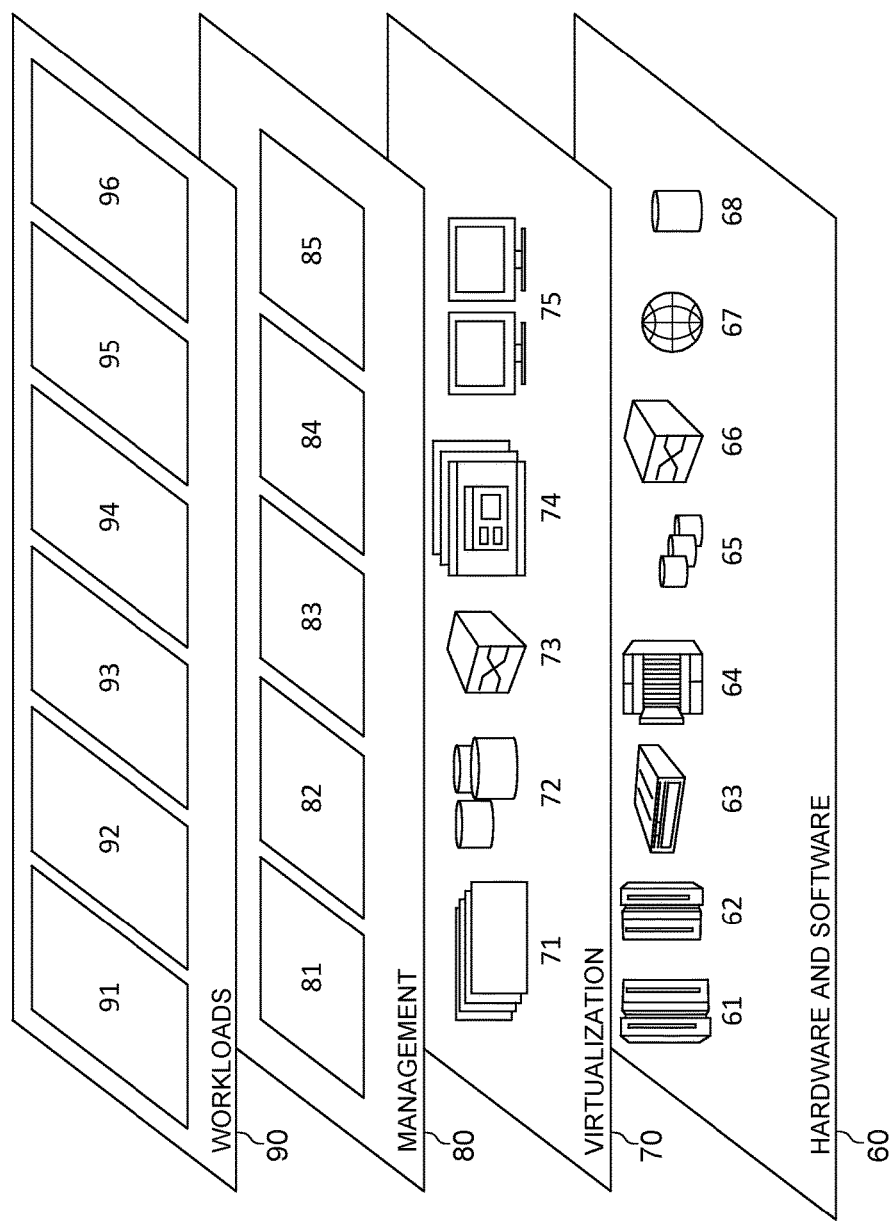
FIG. 8 depicts abstraction model layers according to an embodiment of the present invention.

The server 130 may be a laptop computer, a netbook computer, a personal computer (PC), a desktop computer, or any programmable electronic device or any network of programmable electronic devices capable of hosting and running a microphone volume controller application 128B and communicating with the user computing device 120 via the network 110, in accordance with embodiments of the invention. The server 130 may include internal and external hardware components, as depicted and described in further detail below with reference to FIG. 6. In other embodiments, the server 130 may operate in a cloud computing environment, as depicted in FIG. 7 and FIG. 8.

The microphone volume controller application 128A, 128B may include a data receiving module 132, a main voice recognizer module 134, a main voice database 136, a main voice monitor 138, a volume transformer 140, and a data sending module 142. The microphone volume controller application 128A, 128B may exist, either wholly or in part, on either the user computing device 120 or the server 130 or on both the user computing device 120 and the server 130.

The data receiving module 132 may receive the watermarked voice data from the voice picker 126. Additionally, the data receiving module 132 may receive the voice data from each of the users. Furthermore, the data receiving module 132 may transmit the voice data to the main voice recognizer module 134 and the main voice monitor 138.

The main voice recognizer module 134 may receive the voice data from the data receiving module 132. Additionally, the main voice recognizer module 134 may identify the main voice from all of the voice data by denoising, analyzing, and then separating the main voice from the different timbres. A timbre is unique to each user so the main voice recognizer module 134 may identify and divide voice from other sounds based on the user's timbre. Furthermore, the main voice recognizer module 124 may transmit the main voice data to the main voice database 136 and the main voice monitor 138.

The main voice database 136 may be a repository that stores main voice data from the main voice recognizer module 134. Additionally, the main voice database 136 may store related microphone data from the volume transformer 140.

The main voice monitor 138 may receive voice data from the data receiving module 132 and the main voice recognizer module 134. Additionally, the main voice monitor 138 may compare and analyze voice data in order to determine whether the main voice has changed. The main voice monitor 138 may compare the incoming voice data from the data receiving module 132 to the main voice data from the main voice recognizer module 134. Furthermore, the main voice monitor 138 may transmit the main voice data to the volume transformer 140.

The volume transformer 140 may receive main voice data from the main voice monitor 138. The volume transformer 140 may use an algorithm to adjust the volume of the microphone according to the main voice data. The microphone volumes may be adjusted so that the volume of the main voice's microphone increases and the other microphones in the room decrease in volume. A previous main voice may be adjusted based on Equation 3, illustrated below. y represents the microphone volume. x represents time. a, b, and c represent adjustable parameters greater than zero where their actual value may be determined by the specific environment. Equation 3 is used to gradually adjust the previous main voice to a low volume since a previous main voice is likely to become a main voice again. The volume transformer 140 may transmit the volume data to the data sending module 142.

$$y = c(a-x)^{1/b} \quad (3)$$

The data sending module 142 may receive the volume data from the data sending module 142. Additionally, the data sending module 142 may send the adjusted microphone volume data to the user computing device 120. The data sending module 142 may adjust the user's microphones and send the sounds through the user computing device 120.

Figure 2:
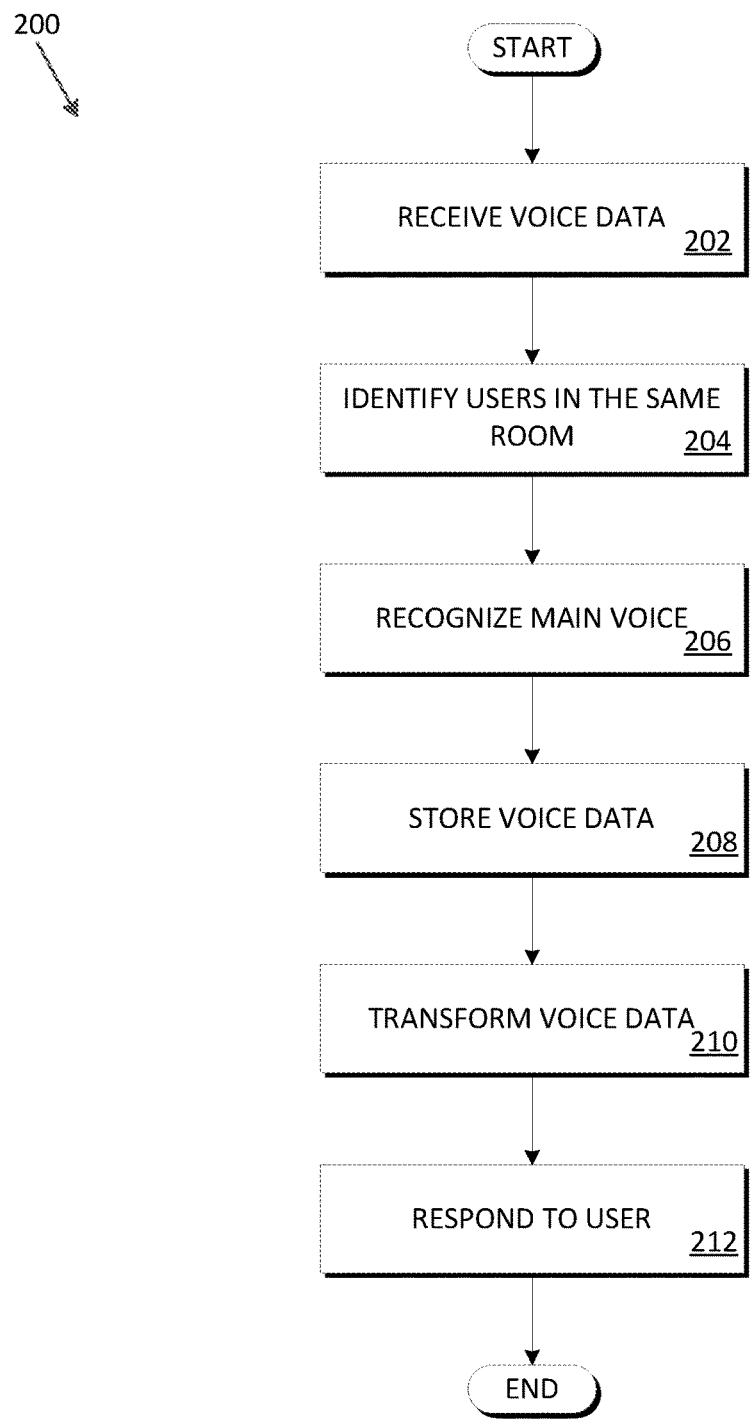
FIG. 2 illustrates an operational flowchart of a microphone volume controller application, in accordance with an embodiment of the present invention.

FIG. 2 is an operational flowchart 200 illustrating the operational steps of the microphone volume controller application 128A, 128B. At 202, the data receiving module 132 receives voice data from the voice picker 126. The voice picker 126 may convert the raw voice or watermarked voice into watermarked raw voice in order to determine whether there are users in the same room. The voice picker 126 may filter the watermark out of the voice using Equation 1 and Equation 2. The voice picker 126 may mix the remaining raw voice with ultra-high frequency using Equation 1 and Equation 2 in order to get watermarked raw voice data. For example, there are three people in the same room using microphones and there is an echo coming from their microphones. The echo may be removed in order to get watermarked raw voice data.

Then, at 204, the voice picker 126 identifies users in the same room and transmits the data to the data receiving module 132. The voice picker 126 may determine users in the same room by identifying the watermark present when the data is in the frequency domain. Users in the same room may have the same watermark in their voice data. The watermark may be in the form of ultra-high frequency that is not detectable to the human ear. The data receiving module 132 may transmit the voice data to the main voice recognizer module 134. For example, when there are three people in the same room, their voice data may produce the same watermark.

Next, at 206, the main voice recognizer module 134 recognizes the main voice. The main voice recognizer module 134 may denoise the microphone data for all of the microphones in the same room. The voice data may be analyzed and separated by tone. The main voice recognizer module 134 may determine the main voice by selecting the microphone with the largest volume. For example, the main voice recognizer module 134 may determine that one user's microphone data is significantly louder than the other two user's microphone data.

Then, at 208, the main voice database 136 stores the voice data. The main voice database 136 may receive the voice data from the main voice recognizer module 134. The main voice database 136 may store the voice data and the main voice determination from the main voice recognizer module 134. For example, the main voice database 136 may store the microphone data from the three users in the same room along with the determination of which user was the main voice.

Next, at 210, the volume transformer 140 transforms the voice data. The volume transformer 140 may receive the voice data and the main voice data from the main voice recognizer module 134. The volume transformer 140 may use an algorithm to determine the volume range for the users in the same room. The user who is considered the main voice, the volume transformer 140 may adjust the volume to be larger. The volume transformer 140 may adjust the volume to be smaller for the other users in the same room in order to avoid an echo. For example, the volume transformer 140 may increase the volume of the microphone for the user with the main voice and decrease the volume of the other two users' microphones.

Then, at 212, the data sending module 142 responds to the user. The data sending module 142 may receive the transforming data from the volume transformer 140. The data sending module 142 may send the adjusted volume back to each of the user computing devices 120. The microphone may be adjusted according to the volume determined by the volume transformer 140. For example, the volume of the microphone for the user with the main voice may be increased.

Figure 3:
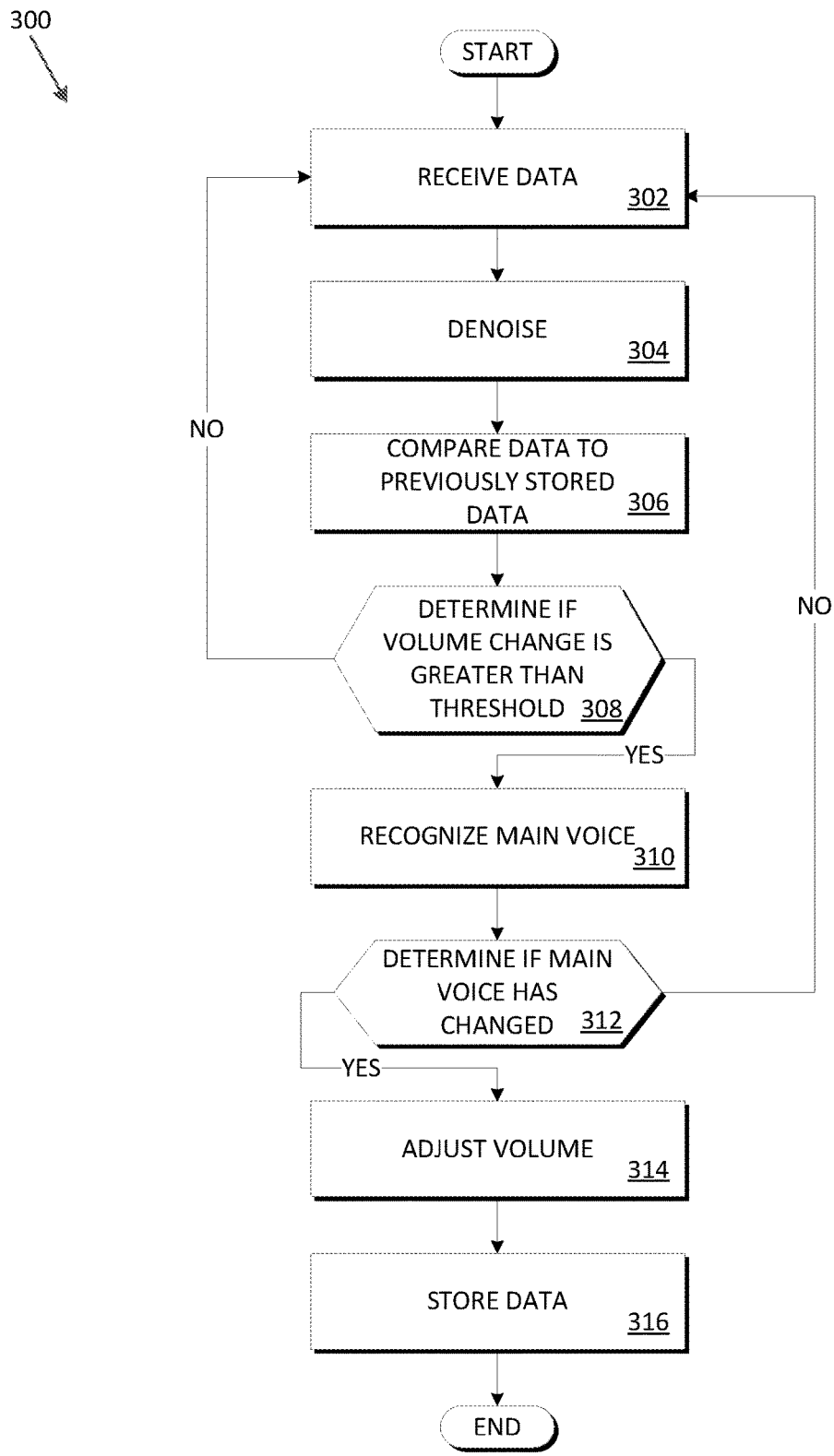
FIG. 3 illustrates an operational flowchart of a main voice monitor, in accordance with an embodiment of the present invention.

FIG. 3 is an operational flowchart 300 illustrating the operational steps of the main voice monitor 138. At 302, the main voice monitor 138 receives real-time voice data from the data receiving module 132. The main voice monitor 138 may receive all of the voice data from all of the microphones determined to be in the same room. For example, the data receiving module 132 may transmit all of the voice data for the three users in the same room to the main voice monitor 138.

Then, at 304, the main voice monitor 138 denoises the voice data. The main voice monitor 138 may denoise the voice data, using known technologies, by reducing other sounds in order to focus in on the users voices. For example, the main voice monitor 138 may remove any background noise in order to analyze the actual voice data from the users.

Next, at 306, the main voice monitor 138 compares the denoised voice data to previously stored data. The main voice monitor 138 may compare the denoised data to data from the main voice database 136. Previous voice data from the same group of users may be compared to the current voice data in order to determine whether the main voice has changed. The previous voice data may be transmitted to the main voice database 136 by the main voice recognizer module 134. For example, the data associated with the original main voice determination may be compared to the current real-time voice data.

Then, at 308, the main voice monitor 138 may determine whether the volume change is greater than the threshold. The threshold value may be pre-defined by an expert and may be constant for all voice data. The threshold value may determine what level of similarity is considered accurate for the same main voice. When the main voice monitor 138 determines that the volume change is not greater than the threshold (step 308, "No" branch), the main voice monitor 138 may continue to step 302 to receive voice data from the data receiving module 132 and monitor for a change in main voice. When the main voice monitor 138 determines that the volume change is greater than the threshold (step 308, "Yes" branch), the main voice monitor 138 may continue to step 310 to recognize the main voice. For example, the volume change may be greater than the threshold value so the main voice monitor 138 may not consider the main voices to be similar.

Next, at 310, when the main voice monitor 138 determines that the volume change is greater than the threshold (step 308, "Yes" branch), the main voice recognizer module 134 recognizes the main voice. The main voice monitor 138 may transmit the voice data to the main voice recognizer module 134. The main voice recognizer module 134 may separate the voices per tone and select the tone with the largest volume as the main voice. The main voice recognizer module 134 may transmit the results back to the main voice monitor 138. For example, the main voice monitor 138 may determine the tone with the largest volume out of the three users who are in the same room.

Then, at 312, the main voice monitor 138 determines whether the main voice has changed. When the main voice monitor 138 determines that the main voice has not changed (step 312, "No" branch), the main voice monitor 138 may continue to step 302 to receive voice data from the data receiving module 132 and monitor for a change in main voice. When the main voice monitor 138 determines that the main voice has changed (step 312, "Yes" branch), the main voice monitor 138 may continue to step 314 to adjust the volume. In order to determine that the main voice has changed, the main voice monitor 138 may compare the original main voice data from the main voice database 136 to the new main voice determination. For example, the main voice monitor 138 may compare the original main voice to the new main voice and determine that they are the same user.

Next, at 314, when the main voice monitor 138 determines that the main voice has changed (step 312, "Yes" branch), the main voice monitor 138 transmits the data to the volume transformer 140 to adjust the volume. The volume transformer 140 may receive the voice data and the main voice data from the main voice monitor 138. The volume transformer 140 may use an algorithm to determine the volume range for the users in the same room. The user who is considered the main voice, the volume transformer 140 may adjust the volume to be larger. The volume transformer 140 may adjust the volume to be smaller for the other users in the same room in order to avoid an echo. The volume transformer 140 may use Equation 3 to adjust the previous main voice. For example, a new main voice is determined so the volume transformer 140 may decrease the volume of the original main voice and increase the volume of the new main voice.

Then, at 316, the new main voice data is stored in the main voice database 136. The new determined main voice data and other associated data may be stored in a repository, such as the main voice database 136 for future comparisons. For example, the new main voice data may be stored with the original main voice data in order to be used for comparisons when current voice data is received.

Figure 4:
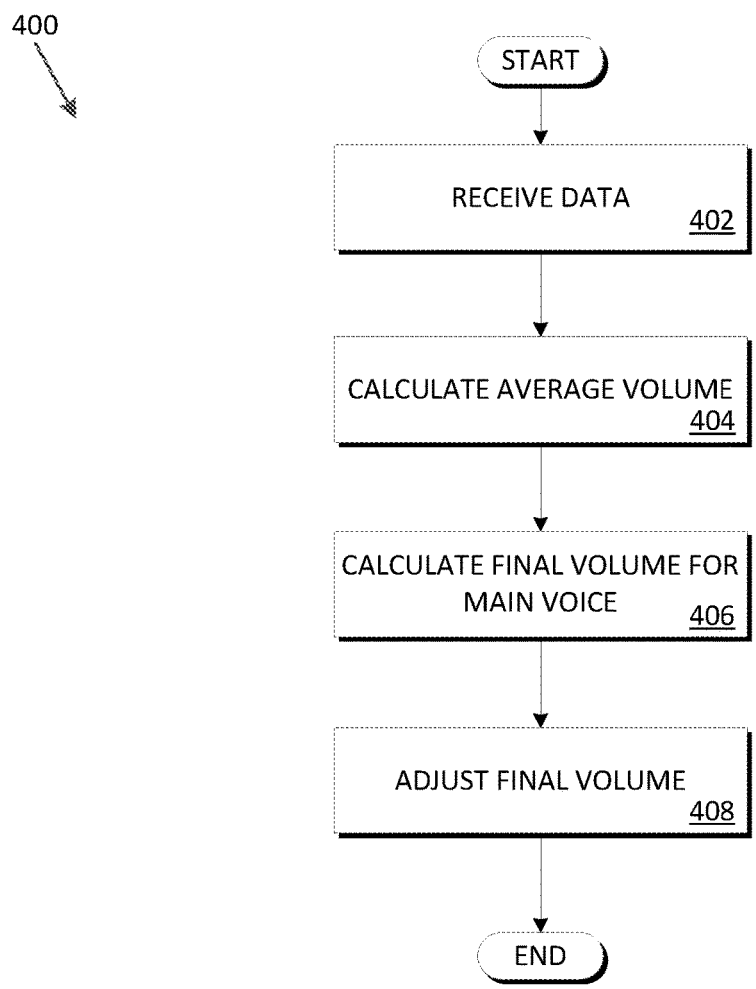
FIG. 4 illustrates an operational flowchart of voice data being transformed, in accordance with an embodiment of the present invention.

FIG. 4 is an operational flowchart 400 illustrating the operational steps of the volume transformer 140. At 402, the volume transformer 140 receives voice data from the main voice recognizer module 134 and the main voice monitor 138. The voice data may include the main voice determination and the data for the other users in the same room. For example, the volume transformer may receive data on which the user is the main voice and the other users who are in the same room as the main voice.

Then, at 404, the volume transformer 140 calculates the average volume. For example, Equation 4, illustrated below, calculates the average voice volume. $X_{average}$ represents the average value of all of the voice volumes. $X_1, X_2, \ldots X_n$ represents the voice volume for each of the microphones. N represents the number of microphones.

$$X_{average} = (X_1 + X_2 + \ldots + X_n)/N \quad (4)$$

Next, at 406, the volume transformer 140 calculates the final volume for each main voice. For example, Equation 5, illustrated below, calculates the final volume for each main voice. Equation 5 may be considered a first-round adjustment. $X_{n,middle}$ represents each voice volume after the first-round adjustment. $X_n$ represents each voice volume before adjustment. $X_{average}$ represents the average value of all of the voice volumes. a represents an adjustable parameter that can be adjusted to fit different environments.

$$X_{n,middle} = X_n + a*(X_n - X_{average}) \quad (5)$$

Then, at 408, the volume transformer 140 adjusts the final volume. For example, Equation 6, illustrated below, adjusts the final volume. Equation 6 may be considered a final round adjustment. $X_{n,final}$ represents the final voice volume after the final round adjustment. $X_{n,middle}$ represents each voice volume after the first-round adjustment. 20 decibels represents a constant that is the smallest voice volume to be heard/detected. When $X_{n,middle}$ is greater than 20 decibels, the value can be heard/detected and does not need further adjustment. When $X_{n,middle}$ is less than 20 decibels, the value cannot be heard/detected and therefore must be adjusted to 20 decibels. The results of the volume transformer 140 may be transmitted to the data sending module 142.

$$X_{n,final} = X_{n,middle} \geq 20 \tag{6}$$

Figure 5:
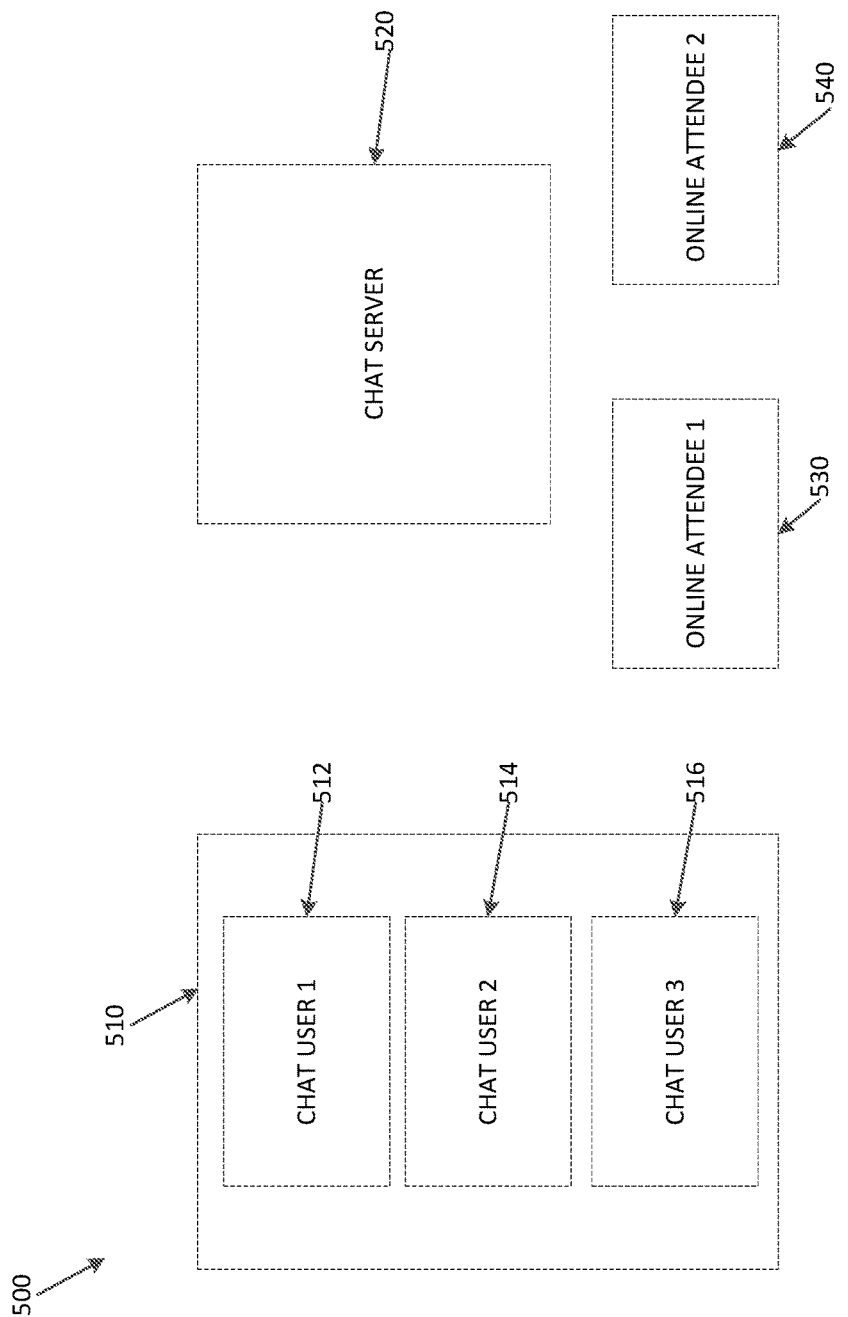
FIG. 5 is an example of an online meeting, where the present invention can be implemented.

FIG. 5 illustrates an example of a functional block diagram 500 of an online meeting according to one embodiment of the invention. The online meeting may include a room 510, further including, a "chat user 1" 512, a "chat user 2" 514, and a "chat user 3" 516, a "chat server" 520, an "online attendee 1" 530, and an "online attendee 2" 540. The "chat server" 520 may contain the microphone volume controller application 128A, 128B. Each of the "chat user 1" 512, the "chat user 2" 514, the "chat user 3" 516, the "online attendee 1" 530, and the "online attendee 2" 540 may contain a voice picker 126 on their user computing devices 120. The voice picker 126 may determine that the "online attendee 1" 530 and the "online attendee 2" 540 have different watermarks than the "chat user 1" 512, the "chat user 2" 514, and the "chat user 3" 516. The "chat user 1" 512, the "chat user 2" 514, and the "chat user 3" 516 may have the same watermark indicating that they may be in the same room 510. Based on the determination, the microphone volume controller application 128A, 128B may receive the voice data from the "chat user 1" 512, the "chat user 2" 514, and the "chat user 3" 516 and continue to analyze it for determining the main voice.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. For example, each described method step or substep may be performed concurrently with other steps or substeps. The terminology used herein was chosen to best explain the principles of the one or more embodiment, the practical application or technical improvement over technologies found in the marketplace, or to enable others of ordinary skill in the art to understand the embodiments disclosed herein.

Figure 6:
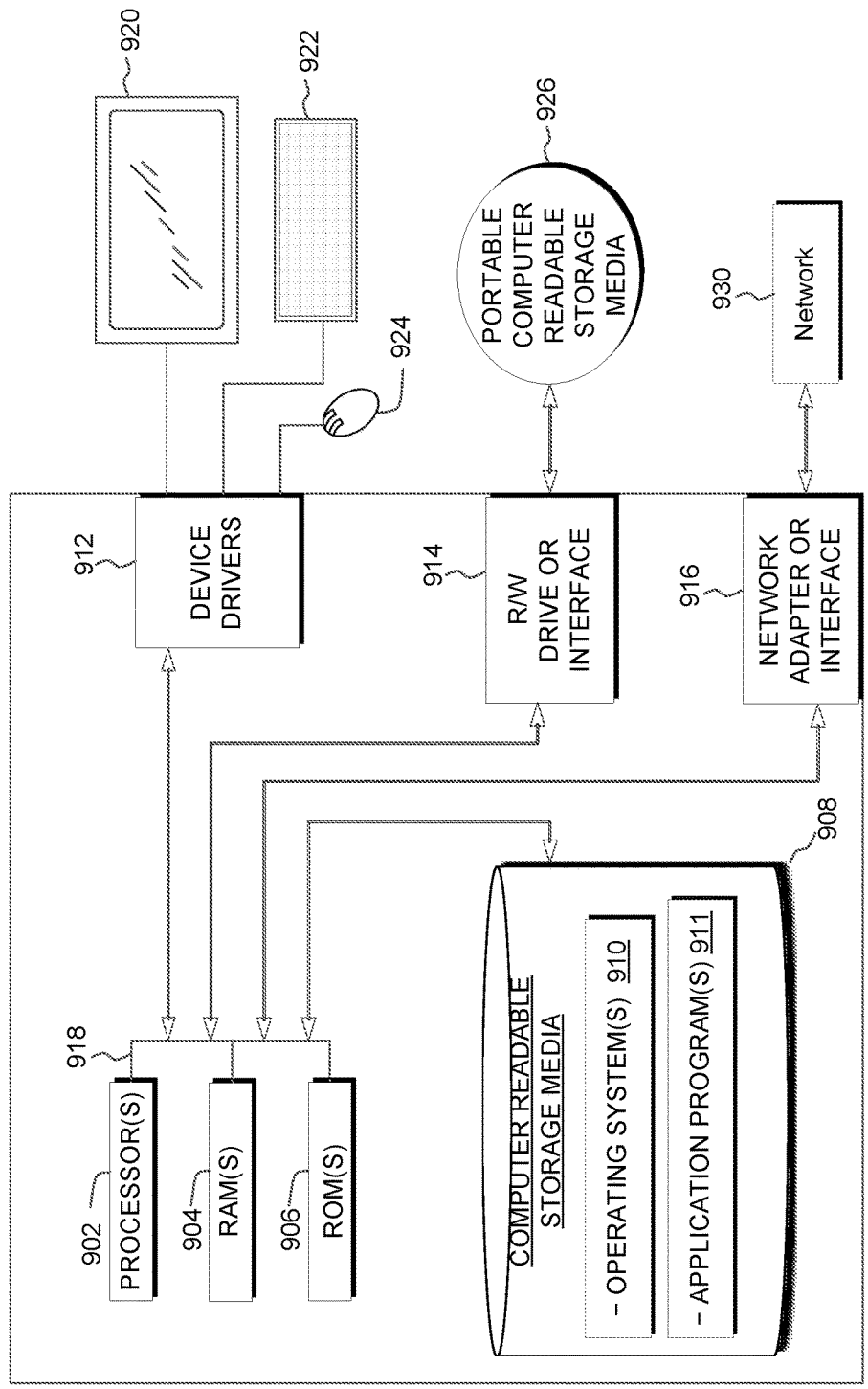
FIG. 6 is a block diagram of components of a computing device of the system for enhancing voice quality for online meetings of FIG. 1, in accordance with embodiments of the present invention.

FIG. 6 depicts a block diagram of components of the user computing device 120 of the system for enhancing voice quality for online meetings 100 of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The user computing device 120 and/or the server 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the microphone volume controller application 128A, 128B (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The user computing device 120 and/or the server 130 may also include a R/W drive or interface 914 to read from and write to one or more portable computer readable storage media 926. Application programs 911 on the user computing device 120 and/or the server 130 may be stored on one or more of the portable computer readable storage media 926, read via the respective R/W drive or interface 914 and loaded into the respective computer readable storage media 908.

The user computing device 120 and/or the server 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the user computing device 120 and/or the server 130 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The user computing device 120 and/or the server 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microphone volume controlling 96. Microphone volume controlling 96 may identify users in the same room and determine the main voice out of the users in the same room. Microphone volume controlling 96 may adjust the volume of the microphones of the users in the same room in order to prevent an echo.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for controlling the volume of microphones in an online meeting, the method comprising:
    receiving, by a computer, a plurality of voice data from a plurality of user microphones;
    identifying one or more users in a same room using the plurality of received voice data and a voice picker, wherein the one or more users in the same room have a same watermark in a set of voice data, wherein identifying one or more users in the same room further comprises:
        converting the plurality of voice data from a time domain to a frequency domain;
        filtering out one or more watermarks from the plurality of voice data;
        mixing the plurality of filtered voice data with ultra-high frequency; and
        converting the plurality of mixed voice data from the frequency domain to the time domain;
    recognizing a main voice of a user from the one or more users in the same room using the voice picker; and
    adjusting a microphone volume for each of the one or more users in the same room, wherein the microphone volume of the main voice of the user is increased.

2. The method of claim 1, further comprising:
    storing the plurality of voice data and the recognized main voice of the user in a database.

3. The method of claim 1, further comprising:
    monitoring the plurality of voice data for a change in the main voice of the user.

4. The method of claim 1, wherein recognizing the main voice of the user further comprises:
    denoising the plurality of voice data;
    separating the plurality of voice data per tone; and
    selecting the tone with a largest volume as the main voice.

5. The method of claim 3, further comprising:
    recognizing a new main voice of a user after monitoring the change in the main voice of the user; and
    adjusting the microphone volume for each of the one or more users in the same room based on the new main voice of the user.

6. The method of claim 1, wherein adjusting the microphone volume further comprises:
    calculating an average volume for the plurality of voice data;
    calculating a final volume for the main voice; and
    adjusting the final volume for the main voice.

7. A computer program product for controlling the volume of microphones in an online meeting, the computer program product comprising:
    one or more non-transitory computer-readable storage media and program instructions stored on the one or more non-transitory computer-readable storage media capable of performing a method, the method comprising:
    receiving, by a computer, a plurality of voice data from a plurality of user microphones;
    identifying one or more users in a same room using the plurality of received voice data and a voice picker, wherein the one or more users in the same room have a same watermark in a set of voice data, wherein identifying one or more users in the same room further comprises:
        converting the plurality of voice data from a time domain to a frequency domain;
        filtering out one or more watermarks from the plurality of voice data;
        mixing the plurality of filtered voice data with ultra-high frequency; and
        converting the plurality of mixed voice data from the frequency domain to the time domain;
    recognizing a main voice of a user from the one or more users in the same room using the voice picker; and
    adjusting a microphone volume for each of the one or more users in the same room, wherein the microphone volume of the main voice of the user is increased.

8. The method of claim 7, further comprising:
    storing the plurality of voice data and the recognized main voice of the user in a database.

9. The method of claim 7, further comprising:
    monitoring the plurality of voice data for a change in the main voice of the user.

10. The method of claim 7, wherein recognizing the main voice of the user further comprises:
    denoising the plurality of voice data;
    separating the plurality of voice data per tone; and
    selecting the tone with a largest volume as the main voice.

11. The method of claim 9, further comprising:
recognizing a new main voice of a user after monitoring the change in the main voice of the user; and
adjusting the microphone volume for each of the one or more users in the same room based on the new main voice of the user.

12. The method of claim 7, wherein adjusting the microphone volume further comprises:
calculating an average volume for the plurality of voice data;
calculating a final volume for the main voice; and
adjusting the final volume for the main voice.

13. A computer system for controlling the volume of microphones in an online meeting, the computer system comprising:
one or more computer processors, one or more computer-readable storage media, and program instructions stored on one or more of the computer-readable storage media for execution by at least one of the one or more processors capable of performing a method, the method comprising:
receiving, by a computer, a plurality of voice data from a plurality of user microphones;
identifying one or more users in a same room using the plurality of received voice data and a voice picker, wherein the one or more users in the same room have a same watermark in a set of voice data, wherein identifying one or more users in the same room further comprises:
converting the plurality of voice data from a time domain to a frequency domain;
filtering out one or more watermarks from the plurality of voice data;
mixing the plurality of filtered voice data with ultra-high frequency; and
converting the plurality of mixed voice data from the frequency domain to the time domain;
recognizing a main voice of a user from the one or more users in the same room using the voice picker; and
adjusting a microphone volume for each of the one or more users in the same room, wherein the microphone volume of the main voice of the user is increased.

14. The method of claim 13, further comprising:
storing the plurality of voice data and the recognized main voice of the user in a database.

15. The method of claim 13, further comprising:
monitoring the plurality of voice data for a change in the main voice of the user.

16. The method of claim 13, wherein recognizing the main voice of the user further comprises:
denoising the plurality of voice data;
separating the plurality of voice data per tone; and
selecting the tone with a largest volume as the main voice.

17. The method of claim 15, further comprising:
recognizing a new main voice of a user after monitoring the change in the main voice of the user; and
adjusting the microphone volume for each of the one or more users in the same room based on the new main voice of the user.

18. The method of claim 13, wherein adjusting the microphone volume further comprises:
calculating an average volume for the plurality of voice data;
calculating a final volume for the main voice; and
adjusting the final volume for the main voice.

* * * * *